Figure 1:
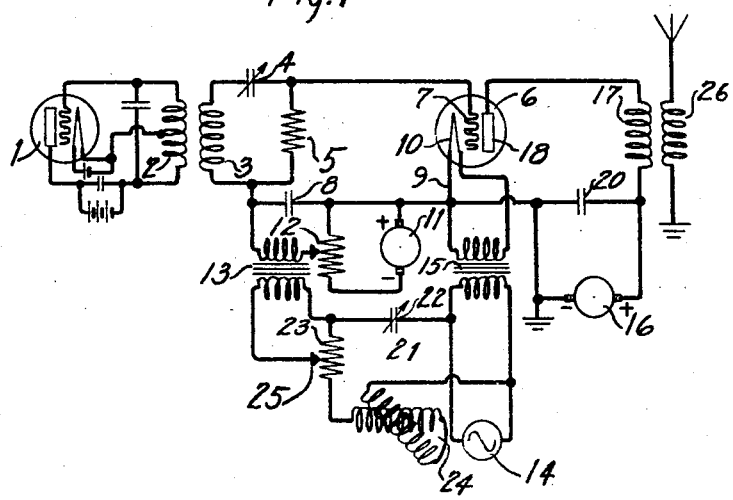

April 10, 1928.

A. A. OSWALD 1,665,674

SYSTEM INCLUDING SPACE DISCHARGE DEVICE

Filed Feb. 7, 1924   2 Sheets-Sheet 1

Inventor:
Arthur A. Oswald
by ─────── Atty.

Patented Apr. 10, 1928.

1,665,674

UNITED STATES PATENT OFFICE.

ARTHUR A. OSWALD, OF EAST ORANGE, NEW JERSEY, ASSIGNOR TO WESTERN ELECTRIC COMPANY, INCORPORATED, OF NEW YORK, N. Y., A CORPORATION OF NEW YORK.

SYSTEM INCLUDING SPACE DISCHARGE DEVICE.

Application filed February 7, 1924. Serial No. 691,173. REISSUED

This invention relates to systems including three electrode space discharge devices and more particularly to an arrangement adapted to compensate the effect of alternating current used for heating the cathodes of the devices and also to provide a circuit, including a space discharge device, for selectively amplifying oscillating current which may be given a relatively high degree of amplification without causing the production of undesired oscillations or "singing" in the amplifier circuits.

As is well known when alternating current is used to heat the cathode of a space discharge device the number of electrons and consequently the amplitude of the current flowing across the space within the device will vary in synchronism with the fluctuations of the current supplied by the heating source.

Various arrangements have been heretofore proposed to compensate for the distorting effect due to the alternating heating current supplied to the cathode of a discharge device. All of the suggested arrangements, so far as known, involve the idea of connecting the anode of the discharge device to a point of the heating current supply source, such that a balanced relation with reference to the potentials effective in causing flow of space current is secured.

When a three electrode space discharge device is included in a circuit for selectively amplifying current of a single frequency the difficulty arises that the circuit has a strong tendency to "sing" and hence the amount or degree of amplification possible with a given amplifier is materially reduced.

The present invention provides an arrangement, including a space discharge device having its cathode heated by alternating current, which is included in a circuit for selectively amplifying a current of single frequency, having means for compensating for the effect of the alternating heating current and also means for materially reducing the tendency to "sing", whereby undistorted and relatively highly amplified current may be produced in the output circuit of the amplifier.

In accordance with this one aspect of invention an alternating current source supplies heating current to the cathode of a three electrode space discharge device the anode of which is connected to one terminal of the cathode and an alternating voltage of the same frequency but varying in opposite phase relatively to the heating current is impressed upon the impedance control electrode of the device to neutralize the modulating effect of the alternating cathode heating current. The neutralizing voltage wave may be derived from a single phase source which supplies the heating current or from one or more phases of a plural phase source, one phase of which supplies heating current to the cathode.

In accordance with another aspect of this invention, a selective amplifying system is provided, comprising a circuit including a three element space discharge device associated with a tuned circuit having in series an inductance, a capacity and a resistance, the terminals of which are respectively connected to the cathode and impedance control element of the discharge device.

One object of this invention is to provide improved methods of heating filaments of space discharge devices.

Another object is to correct the distorting effect introduced into space discharge devices resulting from heating the cathodes with alternating current.

A feature of the invention relates to heating one or more filaments of a system of one or more discharge devices by one or more phases of an alternating current and applying correcting voltages derived from any one or more phases of the source of heating current to an electrode of one or more of the discharge devices.

Another feature of the invention is the provision of means for materially increasing the efficiency of a selective amplifying system.

Still another feature is the provision of means whereby a space discharge device having relatively high amplification may be operated without causing "singing" in the amplifier circuit.

Still another feature is to provide a radio transmitting system including a space discharge oscillator with an amplifying system embodying the features referred to above, whereby the antenna circuit may be supplied with an undistorted modulated carrier wave the frequency of which is substantially constant and independent of impedance variations in the antenna circuit.

Figure 2:
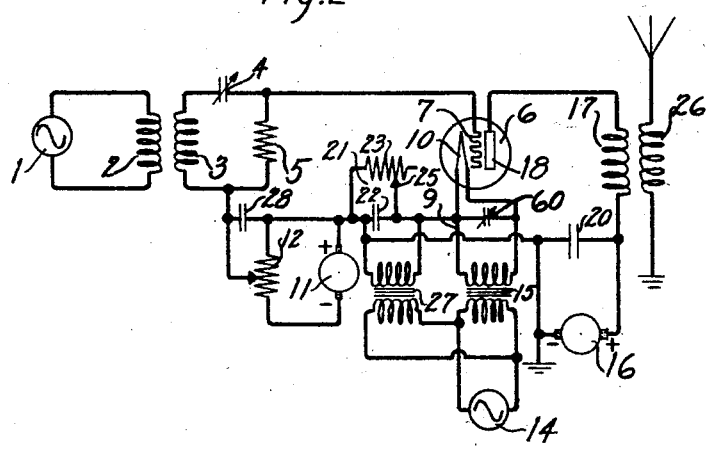
Figure 3:
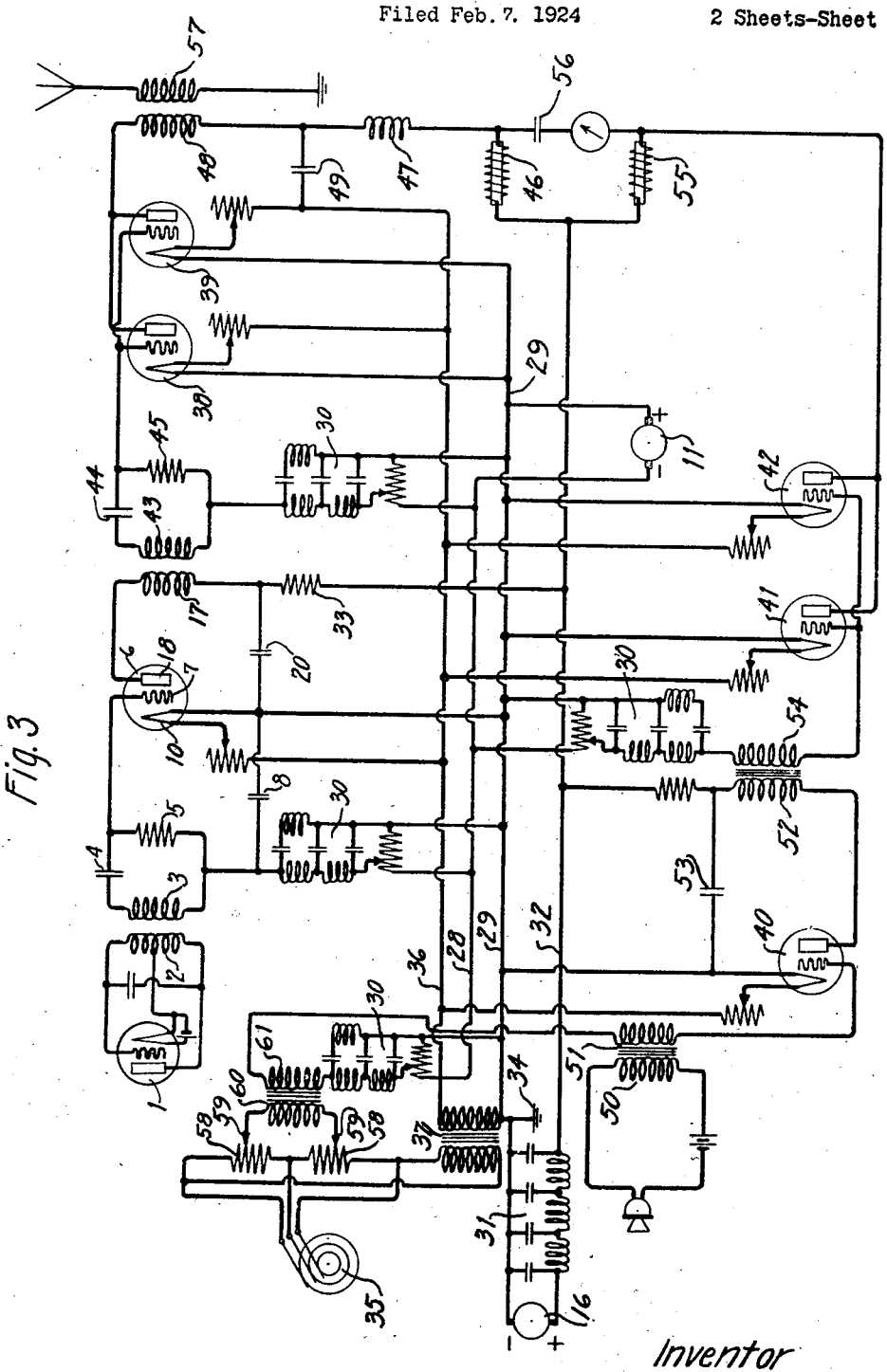

For a complete understanding of this invention reference may be made to the following description read in conjunction with the attached drawing in which Fig. 1 shows a circuit arrangement embodying the invention; Fig. 2 shows a slightly different circuit arrangement including the invention, and Fig. 3 illustrates the invention applied to a transmitting apparatus for a radio telephone system.

Referring to Fig. 1, there is shown a space discharge oscillator 1, similar to that disclosed in U. S. Patent No. 1,356,753 October 26, 1920 to R. V. L. Hartley, having the inductance coil 2 of its frequency determining circuit inductively associated with a coil 3 serially connected with a condenser 4, and resistance 5. The series connected coil 3, condenser 4 and resistance 5 constitute a tuned circuit resonant to the frequency of the current supplied by the source 1. A space discharge device 6 has an input circuit extending from its grid 7 through the tuned circuit and condenser 8 to one terminal 9 of its cathode 10. The drop of potential across the resistance 5 is impressed upon the grid and cathode of the device 6 to control the flow of space current in synchronism with the current supplied by the source 1.

A polarizing potential is impressed upon the grid 7 by the source 11 through a potentiometer 12. The circuit of the polarizing potential may be traced from the adjustable contact of the potentiometer the secondary winding of the transformer 13, resistance 5, grid 7, across the space within the device 6 to the cathode 10, terminal 9 to the potentiometer resistance which is connected across the source 11.

Heating current is supplied to the cathode by an alternating current source 14 through a transformer 15. The flow of alternating current through the cathode 10 will cause the rate of electron emission to vary synchronously therewith and hence the current flow across space within the device 6 under control of the source 1 will be subject to fluctuations due to the heating current supplied by the source 14.

Space current is supplied to the device 6 by the source 16, through a circuit extending from the positive terminal of the source 16, through the coil 17, anode 18, space within the device to the cathode 10 and its terminal 9, to the negative terminal of the source 16.

The alternating current output circuit of the device 6 may be traced from the cathode 10 across the space within the device to the anode 18, coil 17 and condenser 20 to the terminal 9 of the cathode.

In order that the current present in the output circuit of the device 6 may be a faithful replica of the current supplied by the source 1 it is desirable to compensate or neutralize the fluctuations due to the heating current.

Connected to the source 14 is a phase and amplitude adjusting device 21 comprising a condenser 22, a resistance 23, and a variable inductance or variometer 24. By varying the condenser 22 and inductance 24 the phase of the current traversing the circuit 22—23—24 may be shifted relatively to that supplied by the source 14 and by adjusting the contact 25 relatively to the resistance 23 the amplitude of the current supplied to the primary winding of the transformer 13 may be regulated. When the elements of the device 21 are properly adjusted there is produced in the secondary winding of the transformer 13, included in the input circuit of the device 6, a potential wave varying synchronously with the current of the source 14 and in such phase relation thereto that when it is impressed upon the control electrode of the device 6, the distorting or modulating effect of the heating current upon the alternating current flowing through the output circuit of the device 6 is neutralized or compensated.

As shown in this figure, the space discharge device 6 is used to amplify high frequency current and supply the amplified energy to an antenna circuit which includes a coil 26 inductively associated with the coil 17 in the alternating current output path of the device 6.

In systems for amplifying high frequency current including well known space discharge devices the circuits of which are provided with circuits resonant to the high frequency, a difficulty is presented by the tendency of the amplifier circuits to produce sustained oscillations due to feeding back some of the amplified energy to the input side of the circuit. The amplified energy may be fed back by any kind of coupling relation between the output and input circuits associated with the amplifier. A common form of coupling, and one which is particularly difficult to compensate for, is that due to the internal capacity of the amplifying devices. If the tendency to develop sustained oscillations is very marked, it is impossible to realize a high degree of amplification since the amplifier must be operated to give a smaller amplification than that at which the sustained oscillations occur.

It has been found that the production of undesired oscillations due to the amplified energy fed back to the tuned circuit can be prevented by including a resistance, such as 5, of proper value in the tuned circuit and applying the alternating drop of potential across the resistance to the grid 7 of the amplifier. The introduction of the resistance 5 into the tuned circuit renders these circuits selective of a band of frequencies including the high frequency supplied by the source 1. However, lack of sharp selectivity does not materially affect the operation of the amplifiers provided the value of the resistance is so chosen that the resonant circuits suppress current components harmonically related to the carrier frequency, which result from the distorting action of the amplifying devices, and also to limit the amplitude of the energy of the selected frequency to a value such that the production of undesired oscillations is prevented.

As is well known the frequency of the current produced by a space discharge oscillator is susceptible to variations due to impedance changes in the circuits external to the oscillator and hence, if a device of this type is coupled to an antenna circuit by space discharge devices, which inherently possess capacity couplings for high frequencies any variation in the impedance of the antenna circuit will react upon and vary the frequency of the current produced by the oscillator.

However, with the arrangement described above, by using a loose coupling between the source 1 and the input circuit of the amplifier 6, it is possible to supply to the antenna circuit relatively highly amplified energy of substantially constant frequency which is independent of variations in the impedance of the antenna circuit.

Fig. 2 illustrates a transmitting system similar to that described above in which the same reference characters identify the same elements.

In this arrangement the device 21 which serves for supplying a compensating potential wave of proper phase and amplitude and the potentiometer 12, for supplying the polarizing potential to the grid 7, are included in the lead connecting the cathode terminal 9 to the tuned circuit 3—4—5. The device 21 is connected to the same source 14 through a transformer 27. The condenser 28 constitutes a path in shunt to the potentiometer 12, which is of low impedance for the high frequency current supplied to the input circuit by the source 1.

In this case space current is supplied to the device 6 through the following circuit, from the positive terminal of source 16, coil 17, anode 18, across the space within the devices to the cathode 10, terminal 9, the secondary winding of the transformer 27 to the negative terminal of source 16.

The alternating output circuit extends from the anode 18, through coil 17, condenser 20, condenser 22, terminal 9 of the cathode 10 and across space to the anode 18.

The condenser 22 is a by-pass condenser in shunt to the resistance 23 for currents of the frequency supplied by the source 1 and is included in both the grid and plate circuits of the device 6.

The secondary winding of the transformer 27 is connected in shunt to the condenser 22 and hence the voltage supplied through the transformer 27 is applied to both the grid and plate circuits of the amplifier 6. The amplitude of the voltage supplied to the condenser 22 by the transformer 27 should be so chosen relatively to the voltage supplied by the transformer 15 and these two voltages should be in such phase relation, as to compensate the effect due to the alternating heating current supplied to the cathode.

An adjustable condenser 60 is connected in shunt to the secondary winding of the transformer 15.

By adjusting the resistance 23, the condenser 60, or both, the amplitude and phase of the compensating voltage wave applied to the grid and plate electrodes of the device 6 may be accurately regulated.

If the current supplied by the source 1 is of relatively low frequency the by-pass condenser 22 will not be necessary and the condenser 60 may be omitted.

Referring now to Fig. 3, there is shown a transmitter for a radio telephone system in which a space discharge oscillator 1, similar to that described in the patent referred to above, has the inductance coil 2 of its frequency determining circuit inductively associated with a coil 3 to constitute a loose coupling. The oscillator is adapted to supply low power waves of carrier frequency to a tuned circuit comprising in series the coil 3, condenser 4 and resistance 5 the terminals of which are respectively connected to the grid 7 and cathode 10 of a space discharge amplifier. As previously described the drop of potential across the resistance 5 serves to control the flow of space current within the amplifier.

A polarizing potential is impressed upon the grid 7 by the source 11, through a potentiometer which is connected by a conductor 28 to one terminal of the source, and to its other terminal by the conductor 29. The circuit of the polarizing potential may be traced from the adjustable contact of the potentiometer through the filtering device 30, resistance 5, grid 7, across the space within the device 6 to the cathode 10 and through the conductor 29 to the point of beginning. Space current is supplied to the device 6 over the following circuit; from the positive terminal of the source 16, filter 31, conductor 32, resistance 33, coil 17, to the anode 18 across the space within the device to the cathode 10 and conductor 29 to the negative terminal of the source 16 which is grounded at 34. The alternating current output path extends from the anode 18 over the space path within the device to its cathode 10, condenser 20 and the coil 17 to the anode 18.

Heating current is supplied to the cathodes of the discharge devices by an alternating current source 35, herein shown as a three phase generator. One phase of the generator 35 is coupled to the conductors 29 and 36 by a transformer 37. The cathodes of the several discharge devices 6, 38, 39, 40, 41 and 42 are connected in parallel across the conductors 29 and 36.

The coil 17 is inductively associated with the coil 43 which is connected in series with the condenser 44 and resistance 45 to constitute a tuned circuit resonant to the frequency of the carrier wave. The input circuit of the parallel connected devices 38 and 39 extends from their grids to their cathodes and includes the tuned circuit 43—44—45, the right hand conductor of the filter 30 to the conductor 29. Space current is supplied to the parallel connected devices 38 and 39 by the source 16 over the following circuit: from the positive terminal of source 16, conductor 32, choke coil 46, coils 47 and 48, the anodes across the space paths within the devices, to their cathodes and conductor 29 to the negative terminal of the source 16. The alternating current output path extends from the anodes of the devices 38 and 39 across the space paths within the devices to their cathodes, through the condenser 49 and coil 48 to their anodes.

A polarizing potential is impressed upon the grids of devices 38 and 39 by the source 11 through the combined potentiometer and filter 30, in a manner similar to that described above for the device 6.

Speech currents supplied by the microphone circuit flow through the coil 50 inductively coupled to the coil 51 which serves to impress them upon the input circuit of the amplifier 40. Space current is supplied to the device 40 from the positive terminal of the source 16 through the filter 31 and conductor 32 across the space within the amplifier to its cathode and conductor 29 to the negative terminal of the source 16. Amplified speech currents flow through the coil 52 and condenser 53 and are impressed upon the common input circuit of the high power amplifiers 41 and 42 which includes the coil 54 inductively associated with the coil 52. The source 16 supplies space current to the high power devices 41 and 42 through the filter 31, conductor 32 and the choke coil 55 which cooperates with the coil 46 and the source 16 to constitute a substantially constant current plate supply source for the devices 38—39 and 41—42. The high power speech currents are transmitted through the condenser 56 and choke coil 47 to vary the amplitude of the high power carrier wave present in the common alternating current output path of the devices 38—39, whereby modulated carrier waves are supplied by the inductive coupling between the coils 48 and the coil 57 included in the antenna circuit, for transmission to a distant station. For a further description of the operation of a modulating system similar to that described above, reference may be made to U. S. Patent 1,442,147, January 16, 1923, to R. A. Heising. Coil 47 is used to prevent the flow of high frequency oscillations through the speech frequency circuits.

In a manner similar to that described above for the carrier wave amplifiers, a polarizing potential is impressed upon the control electrodes of the devices 40, 41 and 42 by means of a potentiometer-filter combination 30 from the source 11.

Modulation of the carrier and speech currents by the alternating heating current supplied by one phase of the source 35 to the cathodes of the amplifying devices is prevented by impressing a compensating potential of the correct phase derived from one or more phases of the source 35. By way of example there is shown an arrangement for deriving the compensating voltage wave from the other two phases of the source 35.

Connected across each of the other phases of the source 35 is a resistance 58 having an adjustable contact 59 associated with it to constitute a potentiometer. The adjustable contacts 59 are connected together by a circuit including a coil 60 inductively associated with a coil 61 included in the input circuit of the amplifier 40. The combination comprising the potentiometers 58 and coil 60 constitutes a phase shifting means which serves to supply from the other phases of the source 35 to the coil 61 a potential wave which is impressed upon the control electrode of the device 40. By properly adjusting the contacts 59 the derived potential wave may be made to fluctuate in synchronism with but in proper phase relation to the filament heating current and may have an instantaneous value just sufficient when amplified by the tandem connected devices 40 and 41—42 to counteract the effect of the alternating heating current supplied the cathodes of all of the devices included in the system, viz 6, 38, 39, 40, 41 and 42.

A radio telephone transmitter similar to that disclosed in Fig. 3 was tested. The space discharge oscillator generated a carrier current of 2½ to 3 watts at 760,000 cycles a small portion of which is amplified by a single stage of amplification to control the operation of two tandem connected stages of amplification each of which was provided with a circuit including a series resistance and tuned to 760,000 cycles, and three stages of amplifications were used to raise the speech currents to high power. The energy ultimately delivered to the antenna circuit was 1¼ kilowatts and the frequency of the modulated wave did not vary more than 50 cycles even when the antenna circuit was opened.

Instead of impressing a derived voltage wave upon the input circuit of the amplifier 40 to compensate the effect of the alternating heating current in all of the devices, a derived wave of the proper amplitude may be impressed upon the input circuit of each amplifier, as shown in Fig. 1.

From the preceding description it will be seen that the present invention in one aspect provides an arrangement whereby the distorting or modulating effect of alternating current used to heat the cathode of the space discharge device is successfully compensated or neutralized, in another aspect means are provided for increasing the efficiency of three electrode space discharge devices when used for selectively amplifying alternating currents and in still another aspect contemplates a system in which the features referred to above may be used to permit a space discharge oscillator to be coupled by three element space discharge devices to a variable impedance transmission circuit so that there may be supplied to the transmission circuit an undistorted modulated carrier wave, the frequency of which is substantially constant and independent of variations in impedance of the transmission circuit.

Although the invention, for the purpose of completely and clearly disclosing its nature, has been described as applied to radio transmitting systems embodying specific apparatus, it is to be understood that the principles of the different features of this invention may be embodied in many different modified arrangements and applied to various uses and hence that this invention is not limited to the use or details described above, but only by the scope of the attached claims.

The invention claimed is:

1. An electrical apparatus comprising a space discharge device having a plurality of electrodes one of which is a cathode, means for supplying energy to control the operation of said device, means for supplying alternating current to said cathode and means for impressing a voltage wave upon another electrode of said device to compensate the distorting effect of the alternating current supplied to the cathode.

2. An electrical apparatus comprising a space discharge device having a cathode, means for supplying to said device current to be repeated, means for supplying alternating current to heat said cathode, and means for impressing an alternating current voltage upon another electrode of said device to compensate the effect of the alternating heating current upon said repeated current.

3. An electrical apparatus comprising a space discharge device having a cathode, and a control electrode, means for supplying energy to said control electrode for controlling the space current flowing within said device, means for supplying alternating current to heat said cathode and means for impressing upon the control electrode a voltage wave to compensate the distorting effect of the alternating current supplied to said cathode.

4. An electrical apparatus comprising a space discharge device having a cathode, a grid and an anode, a cathode-grid circuit, a cathode-anode circuit connected at one end to one terminal of the cathode, means for supplying energy to said cathode-grid circuit to control the flow of space current within said device, means for supplying alternating current to heat said cathode, and means for impressing upon said cathode-grid circuit a voltage wave to compensate the effect of the heating current upon the current flowing across the space within said device.

5. An electrical system comprising a space discharge amplifier having a cathode and a control electrode, a cathode-control electrode circuit including a tuned circuit having an inductance, capacity and resistance connected in series, said cathode and control electrode being connected to the respective terminals of said resistance, means for supplying alternating current to heat said cathode, means for supplying energy to be amplified to said cathode-control element circuit and means for impressing upon said cathode-control element circuit a voltage wave to compensate the effect of the alternating heating current upon the amplified energy.

6. An electrical system comprising a space discharge device having a cathode, an anode and a control electrode means for supplying energy to control the operation of said device means for supplying alternating current to said cathode, and means for impressing a voltage wave upon the other electrodes of said device for compensating the effect of the alternating current supplied to said cathode.

7. In an amplifier system, a space discharge device having a cathode and a control electrode, a resonant input circuit including an inductance, a capacity and a resistance in series, the resistance having its respective terminals connected to the cathode and control electrode of said device.

8. In a system for producing a high power carrier wave of substantially constant frequency, the combination of a space discharge oscillator for supplying a low power carrier wave, an amplifying system for transforming said low power wave into a wave of high power comprising a plurality of tandem connected circuits each including a three element space discharge device and a circuit tuned to the carrier frequency including in series, inductance, capacity, and a resistance for coupling the discharge device thereto so that the production of undesired oscillations is prevented.

9. In a system for producing a high power carrier wave of substantially constant frequency, the combination of a space discharge oscillator for supplying a low power carrier wave, an amplifying system for transforming said low power wave into a wave of high power comprising a plurality of tandem connected circuits each including a three-element space discharge device and a circuit tuned to the carrier frequency, said circuit comprising series connected inductance, capacity and resistance, the voltage across the resistance serving to control the included discharge device, whereby the production of undesired oscillations is prevented.

10. A carrier transmitting system, comprising a source of carrier waves, means for coupling said source to a transmission circuit by a circuit including a space discharge device and a tuned circuit including a series connected means for preventing impedance variations in said transmission circuit from reacting upon said source of carrier waves.

11. A carrier transmitting system comprising a source of carrier waves, means for coupling said source to a transmission circuit by a circuit including a space discharge oscillator for supplying high frequency waves, means for coupling said oscillator to a transmission circuit by a circuit including a space discharge device and a tuned circuit including series connected means for preventing impedance variations in said transmission circuit from reacting upon said oscillator.

12. A carrier transmitting system comprising a space discharge oscillator for supplying high frequency waves, means for coupling said oscillator to a transmission circuit by a circuit including a space discharge device and having a plurality of electrodes one of which is a cathode, and a tuned circuit including series connected means for preventing impedance variations in said transmission circuit from reacting upon said oscillator, means for supplying alternating current to heat said cathode, and means for impressing upon another electrode of said discharge device a voltage wave to compensate the effect of the alternating heating current supplied to said cathode.

13. A carrier transmitting system comprising a space discharge oscillator, a space discharge amplifier, means for coupling said oscillator to said amplifier, including a tuned circuit having inductance, capacity and resistance in series, means for connecting the input electrodes of said amplifier to the respective terminals of said resistance, a transmission circuit, and means for supplying amplified oscillations to said transmission circuit.

14. A carrier transmission system comprising a space discharge oscillator producing carrier currents of low power, means for raising said low power currents to high power comprising a tuned circuit including in series with the tuning elements a resistance, and a space discharge amplifier having input and output electrodes, said input electrodes connected to the terminals of said resistance, a transmission circuit, and means associated with said output electrodes for supplying high power carrier currents to said transmission circuit.

15. A carrier transmission system comprising a space discharge oscillator producing low power currents of carrier frequency and means for transforming said low power currents into high power currents of the same frequency comprising tandem connected circuits, each including a tuned circuit having a resistance and a space discharge amplifier having input and output electrodes with said input electrodes connected to the terminals of said resistance; a low power source of modulating current, tandem connected circuits for raising said modulating current to high power, each including a space discharge amplifier; means for combining said high power carrier current and modulating current to produce a modulated carrier current, a transmission circuit, and means included in a circuit connected to the output electrodes of one of said carrier current amplifiers for supplying said modulated currents to said transmission circuit.

16. A carrier transmission system, a space discharge oscillator producing low power currents of carrier frequency, means for transforming said low power currents into high power currents of the same frequency comprising tandem connected circuits, each including a tuned circuit having a resistance and a space discharge amplifier having input and output electrodes with said input electrodes connected to the terminals of said resistance; a low power source of speech currents, tandem connected circuits for raising said speech currents to high power each including a space discharge amplifier; means for combining said high power carrier currents and speech currents to produce a modulated carrier current, a transmission circuit, and means included in a circuit connected to the output electrodes of one of said carrier current amplifiers for supplying said speech modulated carrier current to said transmission circuit.

17. A carrier transmission system comprising a space discharge oscillator for producing a carrier wave of low power, a transmission circuit, means for coupling said oscillator to said transmission circuit consisting of tandem connected circuits, each including a tuned circuit and a space discharge amplifier having input electrodes one of which is a cathode, means for connecting an element in said tuned circuit to said input electrodes to prevent distortion of the carrier wave and also to prevent impedance variations in said transmission circuit from reacting upon said oscillator; a source of modulating current, an amplifying system for the modulating current comprising tandem connected circuits each including a space discharge amplifier having a plurality of electrodes, one of which is a cathode, means for supplying alternating current for heating the cathodes of said carrier wave and modulating current amplifiers, means associated with a second electrode of one of said modulating current amplifiers for supplying a control potential thereto for compensating the distorting effect of said alternating heating current, and means for combining said high power carrier wave and said amplified modulating current whereby there is produced an undistorted modulated carrier wave the frequency of which is substantially constant and independent of impedance variations in the transmission circuit.

18. A carrier transmission system, comprising a space discharge oscillator for producing a carrier wave of low power, a transmission circuit, means for coupling said oscillator to said transmission circuit consisting of tandem connected circuits each including a tuned circuit and a space discharge amplifier having input electrodes one of which is a cathode, means for connecting an element of said tuned circuit to said input electrodes to prevent distortion of the carrier wave and also to prevent impedance variations in said transmission circuit from reacting upon said oscillator; a source of speech currents, an amplifying system for the speech currents comprising tandem connected circuits, each including a space discharge amplifier having a plurality of electrodes one of which is a cathode, means for supplying alternating current for heating the cathodes of said carrier wave and speech current amplifiers, means associated with a second electrode of one of said speech current amplifiers for supplying a control potential thereto for compensating the distorting effect of said alternating heating current, and means for combining said high power carrier wave and said amplified speech currents, whereby there is produced an undistorted modulated carrier wave the frequency of which is substantially constant and independent of impedance variations in the transmission circuit.

In witness whereof, I hereunto subscribe my name this 6th day of February, A. D., 1924.

ARTHUR A. OSWALD.